US005329955A

United States Patent [19]

[11] Patent Number: 5,329,955

Gensler et al.

[45] Date of Patent: Jul. 19, 1994

[54] APPARATUS AND METHOD FOR MIXING GASES

[75] Inventors: Wayne C. Gensler, Point Pleasant; John J. Van Eerden, Churchville; Chad F. Gottschlich, Philadelphia, all of Pa.

[73] Assignee: Selas Corporation of America, Dresher, Pa.

[21] Appl. No.: 126,429

[22] Filed: Sep. 24, 1993

Related U.S. Application Data

[63] Continuation of Ser. No. 911,454, Jul. 10, 1992.

[51] Int. Cl.[5] .............................................. G05B 11/00

[52] U.S. Cl. ........................................ 137/7; 137/100; 137/606; 431/86; 431/90

[58] Field of Search ....................... 431/86, 90; 137/98, 137/100, 606, 14, 3, 7

[56] References Cited

U.S. PATENT DOCUMENTS

| | | | |
|---|---|---|---|
| 1,172,729 | 2/1916 | Pettis | 137/606 |
| 1,290,513 | 1/1919 | Collins et al. | 137/100 |
| 2,743,771 | 5/1956 | Earlon-Clarke | 431/86 |
| 2,973,718 | 3/1961 | Deutsch | 137/606 |
| 3,047,003 | 7/1962 | Gurney | 137/100 |
| 3,299,940 | 1/1967 | Phillips et al. | 431/90 |
| 3,664,372 | 5/1972 | Marshall | 137/606 |

FOREIGN PATENT DOCUMENTS

| | | | |
|---|---|---|---|
| 0018176 | 2/1981 | Japan | 137/606 |
| 783943 | 12/1955 | United Kingdom | 431/90 |

*Primary Examiner*—A. Michael Chambers
*Attorney, Agent, or Firm*—Austin R. Miller

[57] ABSTRACT

Method and apparatus for mixing gases while providing a substantially constant gas-to-gas ratio while increasing or decreasing the flow of the mixture, wherein the flows of gases introduced into the mixing step are turbulent and have a Reynolds number of above about 2000.

7 Claims, 7 Drawing Sheets

APPARATUS AND METHOD FOR MIXING GASES

This application is a continuation of application Ser. No. 07/911,454, filed Jul. 10, 1992.

BACKGROUND OF THE INVENTION

1. Field of the Invention

This invention relates to a method and apparatus for mixing gases such as a combustible gas and air, and further relates to a mixer capable of maintaining the gas-to-gas or air-to-gas ratio substantially constant even while the total of flow of the mixture considerably increases or decreases.

The invention is particularly beneficial as a mixing device in providing fuel burners with an advantageous "turndown" range, which is the range extending from maximum to minimum total fluid flow, through which range the mixing device is capable of maintaining the gas-to-gas or air-to-gas ratio substantially constant.

2. Prior Art

There are many needs for effective mixing of gases of various types. Examples include:

Mixing a fuel gas with air for combustion in a burner.

Mixing gases such as hydrogen and carbon monoxide in order to provide a so-called carburizing medium.

Mixing various gases such as propane and air in order to form a so-called blended gas to be used as a backup fuel for a system that normally uses natural gas.

In most instances there is a need not only to produce a mixture of different gases in predetermined ratios, but also to vary the total flow rate of the mixture without causing a significant change of the desired ratios.

Frequently, mixing devices are combined with fans, blowers, or compressors so that the mixture that is produced can be delivered at a controlled, elevated pressure. For combustion applications, the combination is called a mixing machine.

Many kinds of mixing devices have been commercialized. In all of them two or more fluid streams are brought together in some kind of device and leave as a single, mixed stream.

The most basic kind is called a mixing tee. FIG. 1 shows a conventional mixing tee as it would be applied to mixing fuel gas with air. For simplicity, the safety devices that normally would be present are not shown. A blower 12 takes in ambient air and raises its pressure in order to force it through the downstream elements of the system. An orifice 2 establishes a definite relationship between the flow rate of the air and a pressure drop across the orifice. Fuel gas is received from the mains, at a pressure greater than atmospheric, by a gas governor 10.

The gas governor reduces the pressure of the fuel gas, in a pipe 8 just upstream from an adjustable orifice 6, to a value equal to the air pressure measured just upstream from the air orifice 2. As the fuel and air pressures must be equal at the pipe tee 14 where the gas and air come together, the pressure differences across the two orifices must also be equal. Insuring that these two pressure differences are equal is the purpose of the gas governor. The composition of the air-fuel mixture, usually expressed as an air-fuel ratio, can be set to a predetermined value by adjusting orifice 6.

The conventional mixing tee has certain inherent problems that limit the range over which it can maintain a sufficiently constant mixture air-fuel ratio. These are:

1. The gas governor cannot set the inlet pressures of the two gases to be precisely equal. As the pressure differences for the air and the fuel gas become very low at low demand, the mixture composition fails to stay constant because the pressure drops of the gases become increasingly unequal with decreasing demand. This can be compensated by using a smaller air orifice. The pressure drop at minimum demand is then increased enough to make the effect of the gas governor error negligible. Replacing the air orifice with another of just the right size is a nuisance at best if field adjustments become necessary. More likely, there will be a serious delay while the correct orifice is being made.

2. The flow coefficient through an orifice or valve tends to have a constant value at high flow rates, or, more accurately, at high Reynolds numbers. (Reynolds number is a dimensionless quantity which, for the purpose of this invention, may be defined as the gas velocity multiplied by the gas density multiplied by the pipe diameter, just upstream of the valve or orifice, and divided by the gas viscosity.) Conversely, at low Reynolds numbers, the flow coefficient will vary rapidly with changes in the flow rate. As the Reynolds number and the dependency of the flow coefficient on the Reynolds number will be different for the fuel gas and the air, the air-fuel ratio tends not to stay constant at low demand.

3. The basic equations governing a mixing tee show that it cannot normally hold the air-fuel ratio constant if the temperature and composition of the air and fuel gas do not remain sufficiently constant. Weather is a major factor influencing the temperature and composition (humidity) of the air. The blower adds heat of compression to the air and can be a further reason for inconstancy of the air temperature.

A number of devices have been proposed to overcome the limitations of the conventional mixing tee. FIG. 2 shows one of these, a blender valve. Blender valves are disclosed in U.S. Pat. Nos. 1,980,770 and 2,243,704, for example. The two orifices and the pipe tee of FIG. 1 have been merged into a single device, the blender valve, construction shown in FIG. 2. The gas governor 10 is still present to insure equal pressure differences for the two gases being mixed together. The blender valve body 30 contains a rotatable sleeve 31 which cannot move up and down and a movable piston 32 which cannot rotate. The sleeve 31 and piston 32 each have three openings (a mixture opening, an air opening and a gas opening). The three openings are aligned to form two inlet ports for the two gases to be mixed and a single outlet port for the mixture. Rotating the sleeve 31 changes the relative area of the two inlet ports and consequently changes the ratio of the two gases in the mixture. As the piston 32 rises or falls in the cylinder all three ports vary in area, but the relative areas of the ports stay constant.

The piston 32 is automatically positioned vertically by a diaphragm 36. An impulse tube 34 connects one side of the diaphragm to the valve's air inlet. An opening 33 connects the other side of the diaphragm to the interior of the piston. The pressure difference across the diaphragm 36 drives the piston 32 up or down to maintain a constant pressure difference across the inlet ports. The pressure difference is set at a value large enough so that the effect of the gas governor error, discussed in problem 1 above, is negligible. However, the movable piston 32 does not solve problems 2 and 3 which were previously discussed herein. Problem 3 may be partially alleviated in the typical installation of a blender valve by the placement of the blower downstream from the blender valve so that the air temperature is not changed by the heat of compression. This is called a pull-through system. The conventional mixing tee uses a push-through system because the blower is upstream.

The blender valve of FIG. 2 is expensive to make because it requires a substantial amount of precision machining. The close fitting surfaces increase the need for maintenance because of fouling by dirty fuel, air, or corrosion. The lack of a perfect fit between the valve body and the sleeve and between the sleeve and the piston causes leakage between the air and fuel streams that will change the mixture composition at low demands. The result is that the initial and maintenance costs of a blender valve system will be higher than for a conventional mixing tee and the constancy of the mixture composition will not be as great as expected.

Another type of mixing device uses a characterized valve. Examples are described in U.S. Pat. Nos. 2,286,173 and 2,536,678. With these, as demand increases, a motor drives the air valve farther open in order to maintain a constant air pressure difference across the valve. The air valve, in turn, is mechanically linked to a characterized fuel gas valve. The characterized fuel valves have a complex mechanism that permit them to be adjusted to match the air valve so that the air-fuel ratio will stay constant as the demand changes. These overcome the mixing tee problems 1 and 2 previously discussed herein. However, it is difficult and time consuming to characterize them. The characterization is specific to the fuel and the air-fuel ratio. If either is changed, the valve has to be recharacterized. Again, this is expensive compared to a conventional mixing tee.

OBJECTS OF THE INVENTION

An object of the invention is to provide an improved mixing tee having a highly advantageous turndown range through all of which the mixture composition remains substantially constant.

Another object of this invention is to overcome the previously stated problems associated with the blender valve and the conventional mixing-tee.

Other objects and advantages of this invention, including the simplicity, economy and easy operability of the same, and the ease with which the apparatus may be introduced or retro-fitted into existing furnaces, will become apparent hereinafter, and in the drawings of which:

DRAWINGS

DETAILED DESCRIPTION OF THE INVENTION

Figure 1:
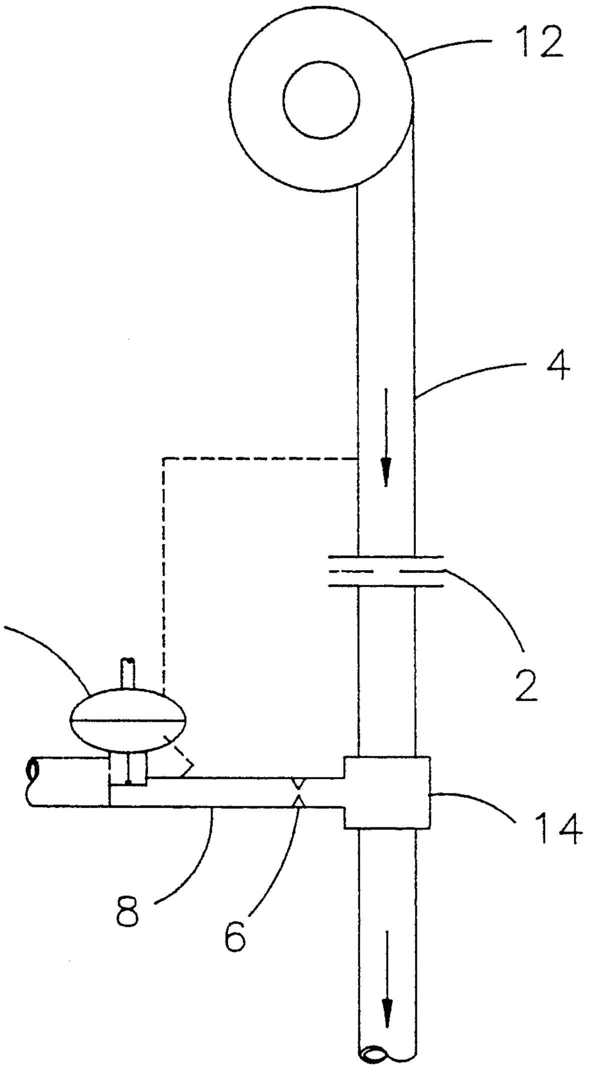
Fig. 1 PRIOR ART
FIG. 1 is a schematic view which illustrates a conventional mixing tee system, as previously discussed.

It will be appreciated that the following description is intended to refer to the specific forms of the invention selected for illustration in the drawings, and is not intended to define or limit the scope of the invention, other than in the appended claims.

Figure 2:
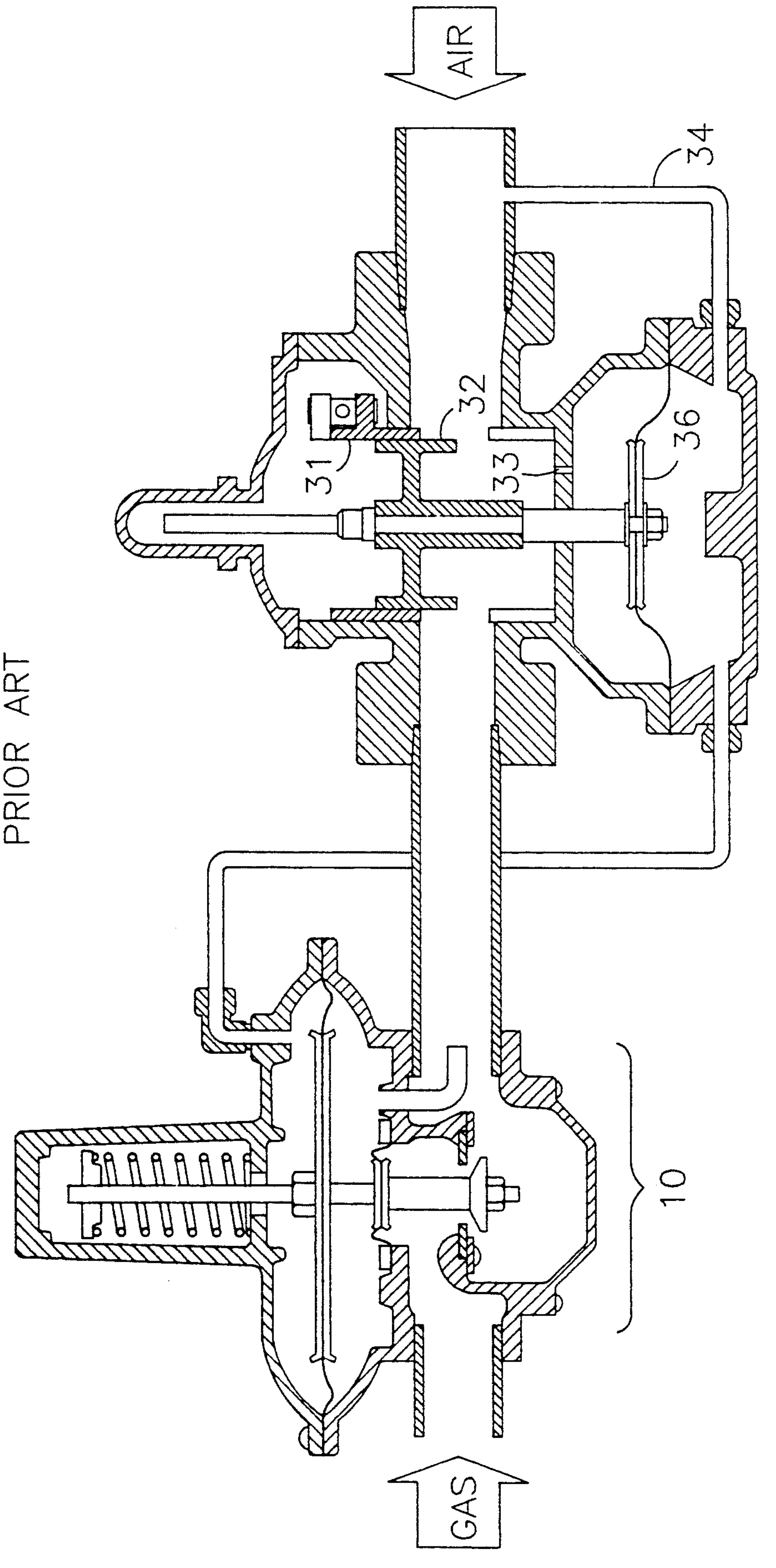
Fig. 2 PRIOR ART
FIG. 2 is a side elevation, partly in section, which shows a conventional blender valve system of the type previously discussed herein.
Figure 3:
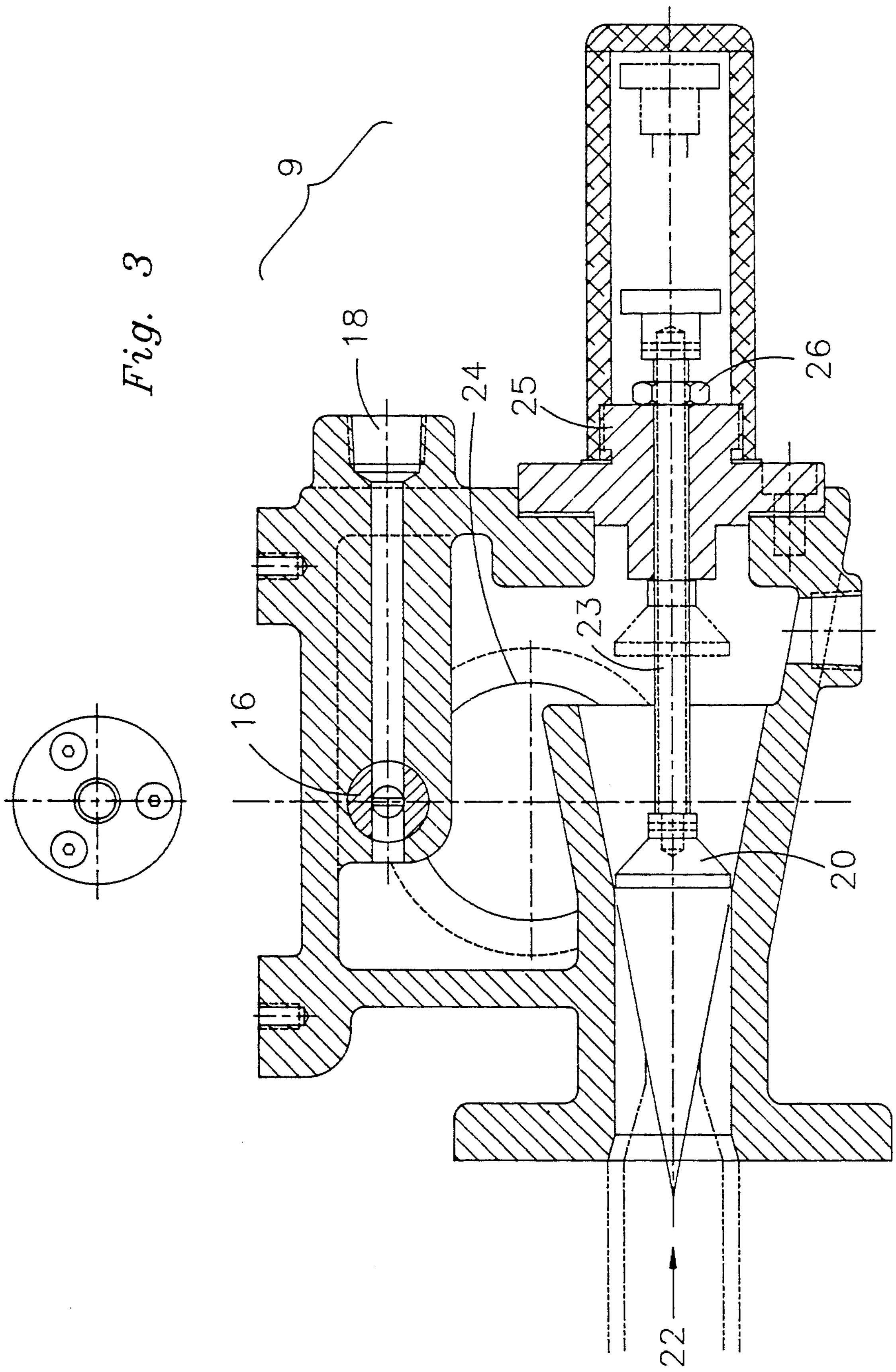
FIG. 3 is a sectional view of a mixing tee embodying features of this invention.
Figure 4:
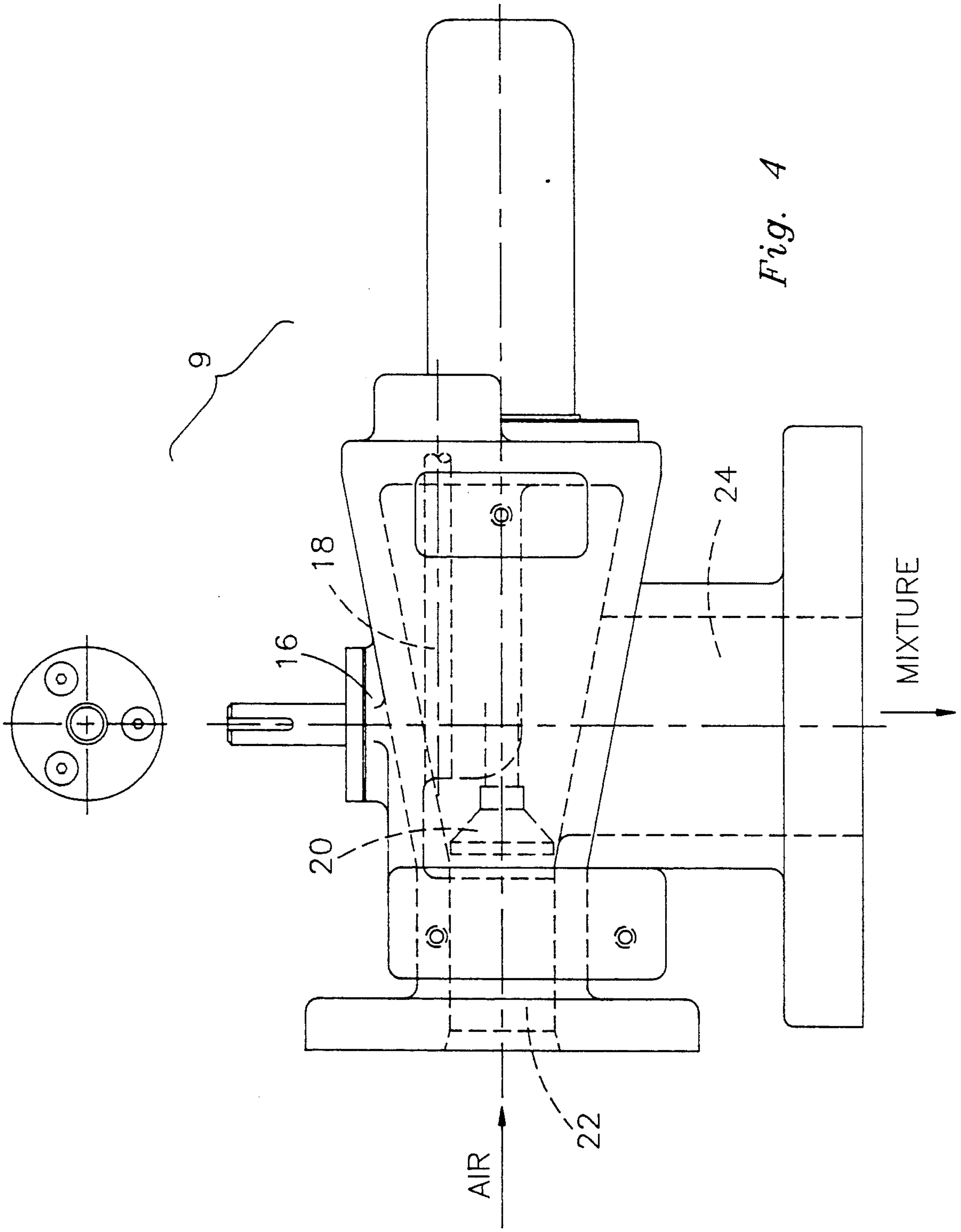
FIG. 4 is a plan view of the mixing tee of FIG. 3.

One embodiment of the present invention is shown in FIGS. 3 and 4 of the drawings. A fuel metering valve 16 is positioned within a passageway 18 carrying fuel to a mixer generally designated 9. An air metering valve 20 is positioned within a passageway 22 carrying air into the mixer 9. A lock nut 26 (FIG. 3) is provided on stem 23 of air metering valve 20 and is threaded in the usual manner to coact with plug 25 to maintain the air metering valve 20 in a fixed position within the mixer 9. The fuel and air metering valves may be control valves of various types and designs, including butterfly valves, for example. An exit passageway 24 is provided and connected into the mixer 9. It carries the mixture of fuel and air from the mixer 9. A blower such as a compressor (not shown in FIGS. 3 and 4) pulls the mixture through passageway 24. In addition, a gas governor (not shown in FIGS. 3 and 4) (see FIG. 2) may be positioned along the fuel passageway upstream of the fuel metering valve 16 and mixer 9.

The operation of the mixer in accordance with this invention will be described next. Assuming the conduit 22 of FIGS. 3 and 4 is connected to introduce air into the mixing chamber, the air valve 20 is pre-adjusted and set to a specified pressure drop at the system's maximum expected demand. The fuel metering valve 16 in the fuel entry conduit 18 of FIG. 3 is adjusted to provide the desired air-fuel ratio. Total flow of the mixture can readily be controlled by means of one or more mixture control valves located downstream of the compressor. A typical application may be to supply an air-fuel mixture to one or more burners used to heat a furnace. A furnace temperature control system would automatically regulate the mixture control valves.

Figure 5:
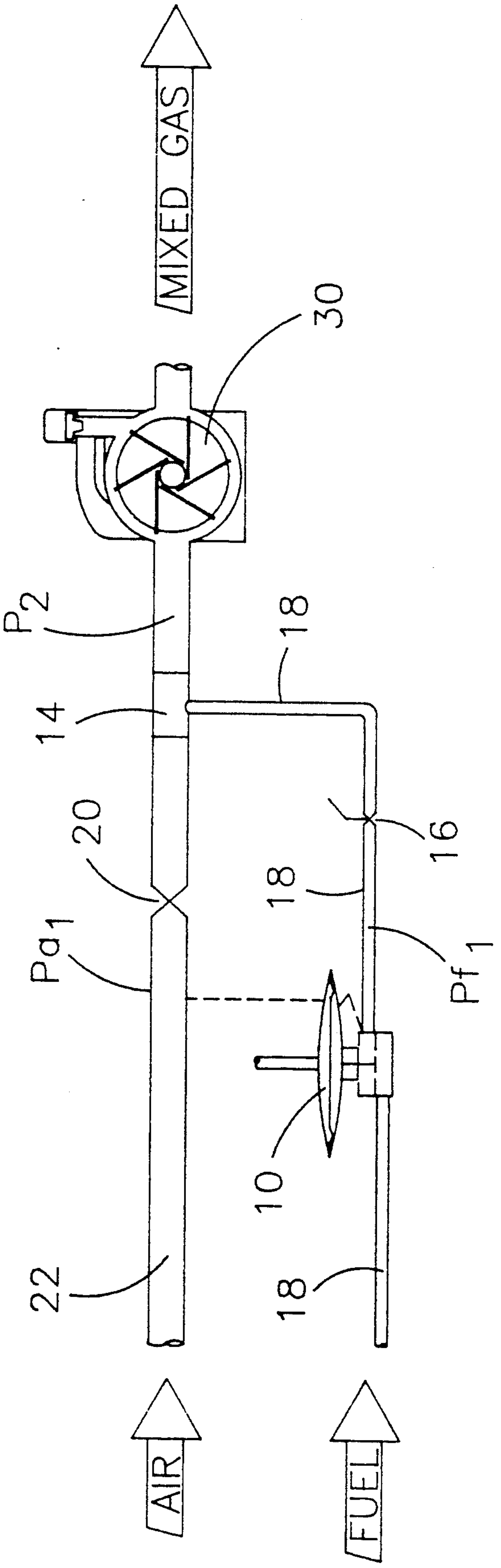
FIG. 5 is a schematic view of a mixing tee system embodying features in accordance with this invention.

FIG. 5 of the drawings is a schematic view used to illustrate the flow of gases through a mixing tee according to this invention. As before, 22 indicates the air line and 18 indicates the fuel line while 10 designates the fuel governor. The mixing tee 14 is connected to receive both fuel and air and to feed the resulting mixed gas in a downstream direction under the influence of the compressor 30 which is located downstream of the mixing tee 14 and pulls the mixed gas from the mixing tee 14.

The fundamental equations for the mixing tee of FIG. 5 are as follows:

$$\text{Air flow rate} = Cd_a \times Am_a \times Y_a \times (P_{a1} - P_2) \,/\, \text{Air density}$$

$$\text{Fuel flow rate} = Cd_f \times Am_f \times Y_f \times (P_{f1} - P_2) \,/\, \text{Fuel density}$$

where the subscript a designates air, the subscript f designates fuel, and:

Cd = Coefficient of Discharge of the valve

Am = Area of Opening in a metering valve

Y = Expansion factor (approximately 1)

$P_{a1}$ = Pressure in the air passageway upstream of the air metering valve $P_{f1}$ = Pressure in fuel passageway before the fuel metering valve $P_2$=Pressure in the mixture passageway downstream of the mixing tee As previously stated, one important object of the invention is to keep the ratio of air flow to fuel flow substantially constant throughout a large turndown range. In order to do this the ratio of pressure drops across the air orifice and the fuel orifice should remain substantially constant. That is the purpose of the gas governor. In the mixing tee of this invention, the areas of the metering valves, $Am_a$ and $Am_f$, remain constant.

The fundamental equations for the mixing tee show that the effect of temperature and composition of the air and fuel enters through their densities. If the ratio of densities of the air and fuel does not stay constant, the air-fuel ratio will not stay constant either. In situations where this becomes important, it can be resolved by inserting a composition sensor into the mixture stream and combining that with an actuator on the fuel control valve.

Also the ratio of air and fuel coefficients of discharge Cd must remain essentially constant. It is an important feature of this invention, as discussed in further detail hereinafter, that it be designed so that the Reynolds numbers of the two entering gas streams remain above about 2000 over essentially the entire turndown range of the mixing device. The coefficients of discharge of both inlet valves will then remain relatively constant. In sharp contrast, the coefficients of discharge change rapidly in the event of use of a Reynolds number of less than about 2000.

EXAMPLES

Figure 6:
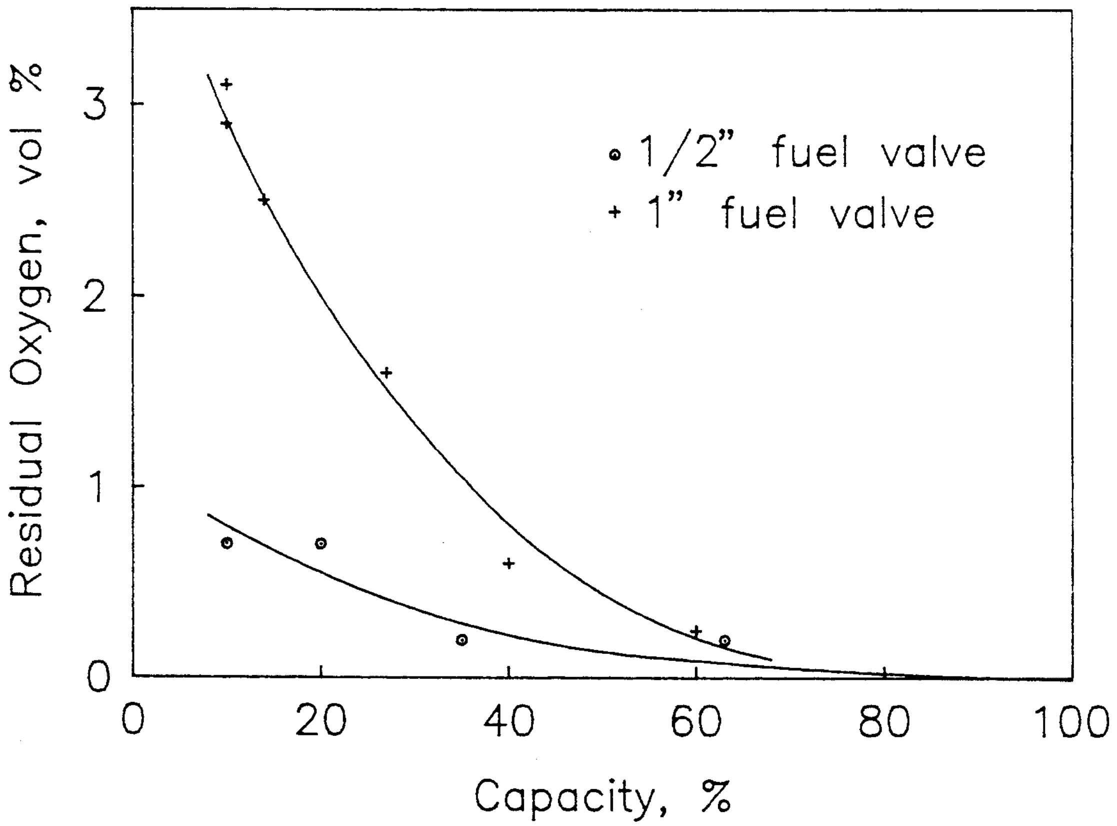
FIG. 6 is a graph showing test data for a ½-inch and a 1-inch test valve.

Th foregoing effect can be seen clearly in FIG. 6 which is based on test data using two different fuel valve sizes. In one test a 1" valve was used. It had an inlet pipe with an inside diameter of 1.049". In the other test, a ½" valve was used. Its inlet pipe had an inside diameter of 0.622". In both tests, a 2" butterfly valve was used for the entering air. At 100% capacity, the pressure difference across the air valve was set at 15" water gauge for both tests. 100% capacity was 3250 cubic feet per hour of mixture for the 1" fuel valve and 3310 for the ½" valve. During the tests, the residual oxygen content (expressed as volume percent in dry combustion products) in the combustion products was measured. The difference between the measured oxygen at 100% capacity and at other capacities is plotted versus percent capacity in FIG. 6. It has been found that the smaller valve maintained a more constant mixture composition.

Figure 7:
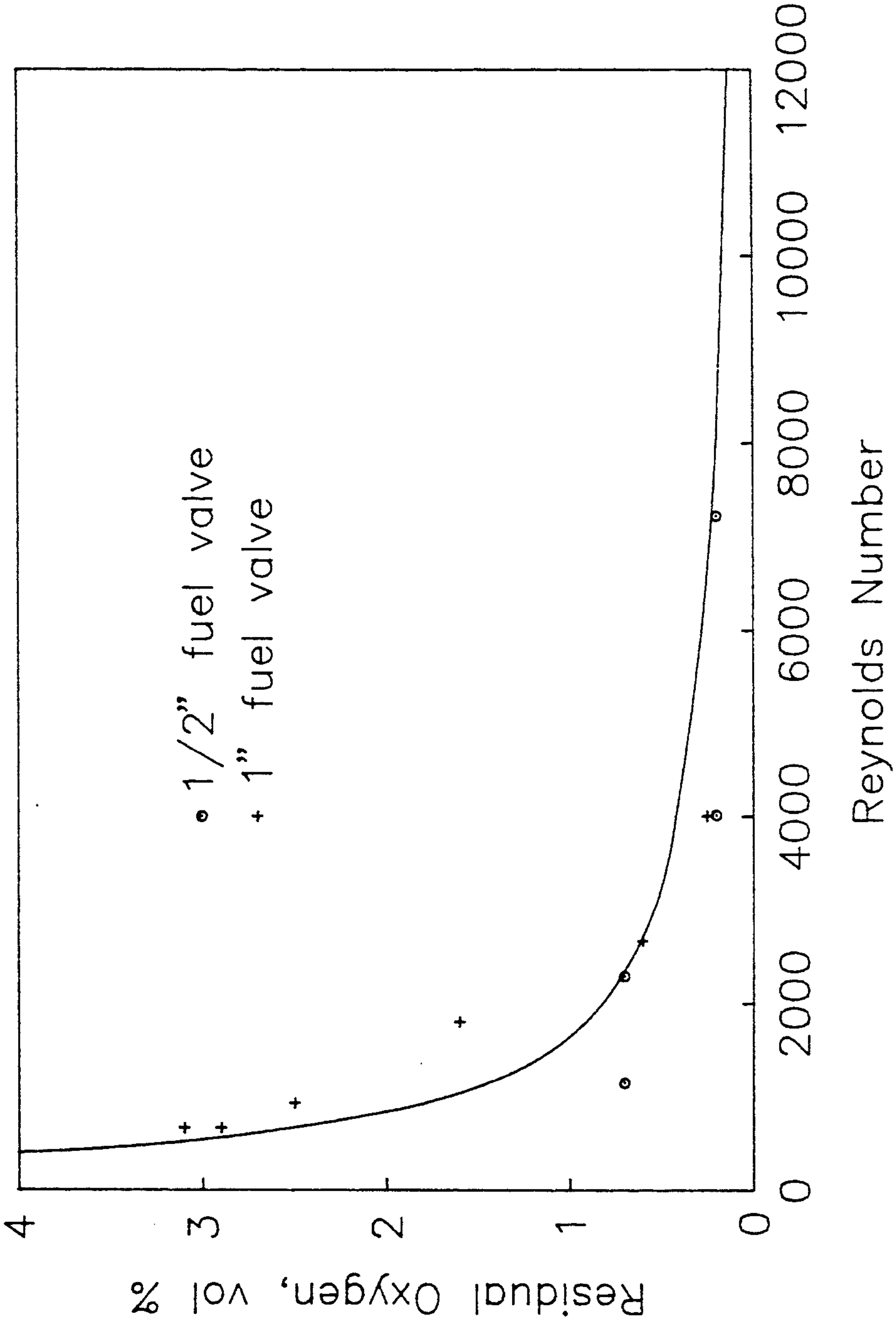
FIG. 7 is a graph plotting residual oxygen against Reynolds number.

In FIG. 7 the oxygen difference is plotted versus Reynolds number. The data for the two fuel valves, as seen in FIG. 7, strongly confirms our discovery of the importance of designing the system to insure a Reynolds number above about 2000.

In accordance with this invention, when mixing two different gases A and B with each other, the conduits through which the two gases approach the control valves are intentionally made small enough to insure turbulent flow of gases as they enter the valves. More particularly, the area of the conduits is preferably sized to cause the gases to flow with a Reynolds number above about 2000, preferably above about 6000. The foregoing relationships apply to various mixtures of different gases, including hydrogen, carbon monoxide, propane and air, but apply with particular effect to mixtures of fuel gas and air where the volumetric flow of air greatly exceeds the volumetric flow of fuel gas.

Although a typical turndown ratio for many combustion applications is considered quite acceptable if it can reach a value of 5:1 with an air-fuel ratio variation of less than 1%, surprisingly the novel mixing apparatus in accordance with this invention, operating at a Reynolds number above 2000, can easily provide for as much as a 10:1 turndown ratio or even more and still produce outstanding results. In sharp contrast, when fuel is supplied at a Reynolds value below about 2000, it is essentially impossible to obtain a constant air-fuel ratio through even a relatively narrow turndown range.

Another characteristic of the Reynolds number consideration is that it decreases as the size of the mixing tee decreases. This phenomenon makes it necessary to take greater care in the design of small mixing tees to assure the presence of a Reynolds number above about 2000.

This invention eliminates many problems associated with the conventional mixing tee system, including lack of flexibility with respect to matching the capacity of the mixing tee with the requirements of the application. The mixing tee of this invention includes a field-adjustable air orifice (see for example valve 20 of FIG. 3) for adjusting the capacity for air flow and therefore the capacity of the mixing tee to produce the gas mixture. This enables the user to benefit from maximum turndown for the application by matching the capacity of the mixing tee to the capacity of the system. In conventional systems using fixed orifices, the mixing tee capacity cannot exactly match system capacity, thus reducing actual turndown capabilities.

Conventional mixing tees are normally push-through systems, i.e., have the compressor upstream of the mixing tee. The compressor accordingly applies heat of compression to the combustion air before it passes through the mixing tee. This can be a problem. For example, in a test of a mixing tee used to mix fuel gas with air, a thermometer was placed in the discharge of the compressor to monitor the temperature of the mixture. At start-up the temperature was 72° F. and thirty minutes later it was 111° F. This change in air temperature (assuming constant fuel temperature) would change the mixture analysis for a push-through system from 2.2% oxygen to 0.5% combustibles. Thus, the pull-through system is superior for maintaining a substantially constant air-to-gas ratio because the heat of compression is not added until the mixture has been formed.

The apparatus in accordance with this invention also has the advantage that almost no moving parts are needed, resulting in minimum maintenance. As an option, the fuel valve may be provided with an actuator to automatically control the air-fuel ratio. Because the air valve is stationary once it has been pre-set, it presents no problem of jamming from fouling, corrosion, or the like.

A further advantage of the mixing apparatus of this invention is low cost of construction, which will be apparent upon examination of the drawings.

Although this invention has been described with reference to particular forms of apparatus, and to a particular sequence of method steps, it will be appreciated that many variations may be made without departing from the spirit and scope of this invention. For example, equivalent elements may be substituted for those specifically described, parts may be reversed, and certain features of the invention may be used independently of other features, all within the spirit and scope of the invention as defined in the appended claims.

The following is claimed:

1. In a method of mixing gases (A) and (B) to maintain a substantially constant ratio of said gases throughout the range from minimum flow rate to maximum flow rate, the steps which comprise:

(a) feeding gas (A) and controlling its pressure drop at a specified value at the expected maximum flow rate demand through a passage into a mixing area, (b) feeding gas (B), and controlling the ratio of its flow to gas (A), through a different passage into said mixing area, thereby mixing gases (A) and (B), and (c) flowing the resulting mixture from said mixing area, wherein the gas (A) and the gas (B) are caused to flow at speeds to cause turbulent flows of gases (A) and (B) upstream of said controlling steps, wherein said speed is controlled to attain a Reynolds number of gases (A) and (B) above at least about 2000.

2. The method defined in claim 1, including the step of providing unequal amounts of flow wherein the amount of flow of gas (A) exceeds the amount of flow of gas (B); and controlling the velocity of gases (A) and (B) to cause turbulent flow of gases (A) and (B) through said passage prior to said controlling steps (a) and (b).

3. The method defined in claim 2 wherein said velocity is controlled to attain a Reynolds number of gases (A) and (B) above at least about 6000.

4. The method defined in claim 1 wherein said resulting mixture is caused to flow by pulling it from said mixing area.

5. In an apparatus for mixing gases (A) and (B) with each other, which is capable of maintaining a substantially constant ratio of said gases even while the total flow of the mixture of said gases considerably increases or decreases, the combination which comprises:

(a) means forming a mixing chamber, (b) means forming a supply conduit and an inlet passage connected for introducing gas (A) to said chamber, with control means for controlling the pressure drop of gas (A) at a specified value at the flow rate required at the expected maximum demand, (c) means forming a separate supply conduit and an inlet passage and control means connected for introducing gas (B) to said chamber for mixing with gas (A) to form a mixture therein, and for adjusting the ratio of flow of gas (B) to gas (A), turndown means for varying the flow rate of the mixture therethrough an entire turndown range, extending from maximum turndown to minimum turndown, (d) exit means connected to said chamber forming an exit for said mixture, and (e) wherein the cross-sectional areas of conduits (b) and (c) are of a predetermined size to insure turbulent flow of gases (A) and (B) in the conduits to maintain substantially constant flow coefficients for gases (A) and (B), wherein the areas of the conduits (b) and (c) are sized to cause the entering gases (A) and (B) to flow with a Reynolds number above about 2000 throughout said turndown range.

6. The apparatus of claim 1 wherein said Reynolds number is above about 6000.

7. Apparatus for mixing a combustible gas with air and maintaining the mixture at a substantially constant gas-to-air ratio throughout the range from minimum flow rate to maximum flow rate while increasing or decreasing the total flow of the mixture throughout said range comprising:

(a) a mixing tee, (b) an air-metering valve connected to deliver air to said mixing tee, and to control its pressure drop at a specified value at the expected maximum demand, (c) a combustible gas metering valve for adjusting the ratio of flow of gas to air, (d) conduit means connected for supplying combustible gas to said combustible gas metering valve, (e) conduit means connected for supplying air to said air metering valve, (f) means for matching the pressure of said gas with the pressure of said air, (g) means for connecting the air metering valve and the combustible gas metering valve to the mixing tee, and (h) means for flowing the mixture from the mixing tee, wherein the areas of conduit means (d) and (e) are predetermined to ensure Reynolds numbers above about 2000 for said gas and air throughout the range from minimum flow rate to maximum flow rate.

* * * * *